June 28, 1927.
I. J. McCULLOUGH
BEARING MOUNTING
Filed Jan. 4, 1926
1,633,994
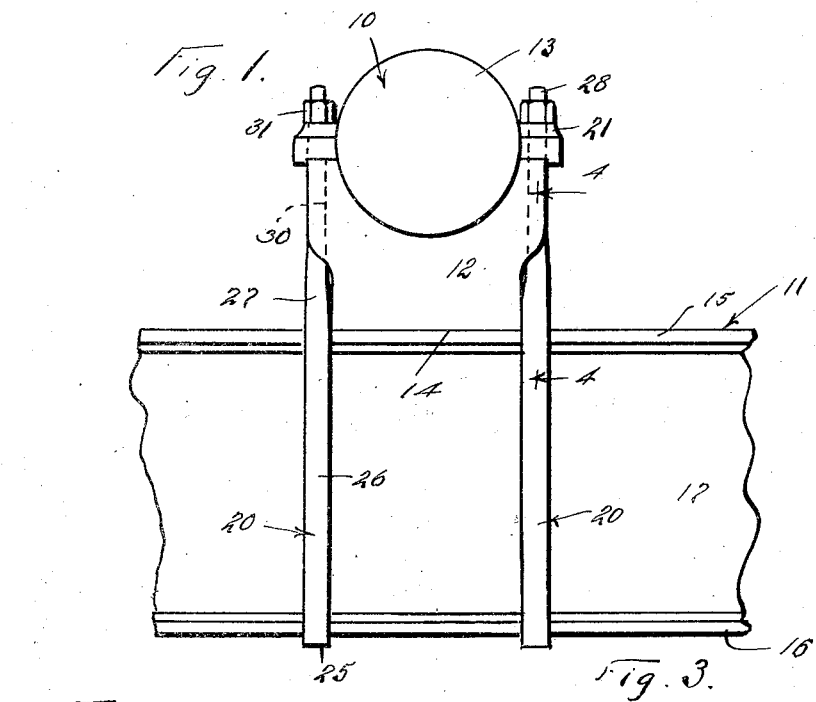
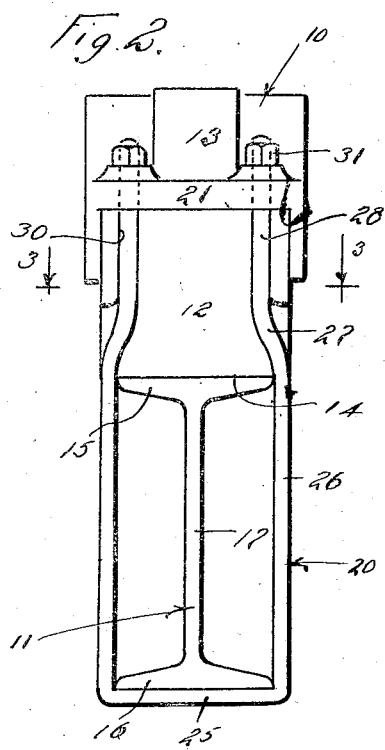
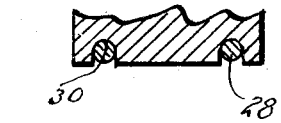
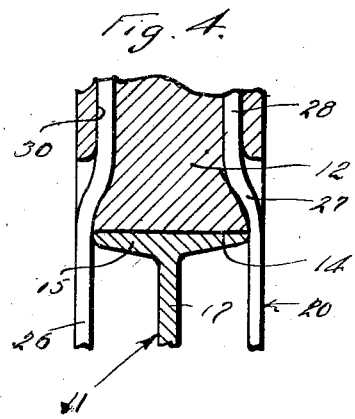
Inventor
Ira J. McCullough
by
his Attorney Patented June 28, 1927.

1,633,994

UNITED STATES PATENT OFFICE.

IRA J. McCULLOUGH, OF HUNTINGTON PARK, CALIFORNIA.

BEARING MOUNTING.

Application filed January 4, 1926. Serial No. 79,085.

This invention relates to a bearing mounting and has particular reference to a mounting suitable for mounting a bearing on a beam, or like support. It is an object of my invention to provide a simple, effective and practical construction of this character.

My present invention relates, generally, to a construction for mounting a shaft bearing on a beam or the like, and is particularly useful for use in mounting the bearings of a crown block such as is used in a well drilling rig. In the particular situation just referred to, the bearings which carry the shafts that in turn carry the sheaves, are mounted on a frame formed or built of beams, usually steel eye beams. It is desirable that the bearings be mounted securely on the beams of the frame, and at the same time that they be detachable so that they can be repaired or replaced from time to time.

It is an object of this invention to provide a simple and secure means of mounting a bearing on a beam such as I have just referred to.

Another object of my invention is to provide a bearing mounting including bolts which will remain in place when released.

Another object of my invention is to provide a bearing mounting in which the bolts which operate to hold the cap of the bearing, also operate to effectively hold the bearing against shifting transversely of the beam.

It is another object of my invention to provide a bearing mounting of the character above specified in which the mounting bolts engage entirely around the beam in place of engaging only a single part of the beam as is the case in usual bearing mountings of this character.

The various objects and features of my invention will be best and more fully understood from the following detailed description of a typical preferred form of my invention, throughout which description reference is had to the accompanying drawings, in which:

Fig. 1 is an end elevation of a typical shaft bearing showing it mounted on a beam by the construction provided by this invention;

Fig. 2 is a side elevation of the bearing shown in Fig. 1, being a view taken as indicated by line 2—2 on Fig. 1;

Fig. 3 is a detailed sectional view taken as indicated by line 3—3 on Fig. 2;

Fig. 4 is a detailed sectional view taken as indicated by line 4—4 on Fig. 1.

In the drawings I have shown my present invention applied to a bearing 10 and beam 11 of the general type and construction ordinarily found in the crown block of a well drilling rig. The bearing 10 is a split bearing including, generally, a box section 12 and a cap section 13 which cooperate to carry the shaft. The bearing sections are divided or split horizontally in the manner common to bearings used in this class of construction. The box 12 of the bearing is provided with a flat bottom 14 adapted to engage the top flange 15 of the beam 11. The beam 11 shown in the drawings is an ordinary eye beam including a top flange 15 and a bottom flange 16 connected by a rib or webbing 17.

In accordance with my present invention the two sections of the bearing 10 are secured together and to the beam 11 by U-bolts 20. The U-bolts are located at either side of the bearing and fit around or embrace the beam and extend upwardly through the flanges 21 on the bearing cap 13. The bottom parts 25 of the U-bolts extend under the lower flange 16 of the eye beam, while the side parts 26 extend straight upwardly from the lower flange 16 to a point immediately above the upper flange 15 of the beam, where they are bent inwardly at 27 so that their upper end portions 28 are in position to fit into vertically disposed recesses or grooves 30 in the sides of the bearing box 12. The parts 28 project upwardly through the flanges 21 of the cap 13, and have retaining nuts 31 screw threaded onto their upper ends. The grooves 30 are formed in the sides of the box in vertical alignment with the openings provided in the flanges 21 to pass the bolt parts 28. The lower end portions of the grooves may be enlarged and made to open outwardly at the end of the box to accommodate the curved parts 27 of the bolts. With the construction just described the bolts 20 cannot become accidentally displaced from the beam as the parts 28 are sufficiently closed together so that the bolt cannot be removed from the beam without springing it to spread the parts 28 apart. Further, it is to be noted that the bolts are properly held in engagement in the grooves 30 by the cap 13, and that the parts 28 of the bolts in extending into the grooves 30 operate to hold the box 12 against shifting or moving transversely of the beam. Further, my construction holds the bearing effectively against transverse movements on the beam without providing the box section of the bearing with flanges or over-hanging parts to engage the beam. By constructing the U-bolts so that it is necessary to spring their outer or upper portions apart in order to apply them to or remove them from the beam, the inconvenience and danger of the bolts dropping from the beam when the nuts are removed are entirely eliminated.

Having described only a typical preferred form of my invention I do not wish to limit myself to the specific details set forth, but wish to reserve to myself any changes or variations that may appear to those skilled in the art or fall within the scope of the following claims.

Having described my invention I claim:

1. A bearing mounting including a support, a bearing, and a U-bolt engaging around the support and having its end portions offset inwardly and engaging the bearing to hold it on the support.

2. A bearing mounting including a support, a bearing having grooves, and a U-bolt engaging around the support and having its end portions inwardly offset and carried in the grooves in the bearing.

3. A bearing mounting including a support, a bearing comprising a cap and a box having vertical grooves in opposite sides, a U-bolt engaging around the support and having its ends offset inwardly to extend through the grooves and through openings in the cap, and nuts on the ends of the bolt above the cap.

In witness that I claim the foregoing I have hereunto subscribed my name this 1st day of December, 1925.

IRA J. McCULLOUGH.